W. SULLIVAN.
FRUIT PEELER.
APPLICATION FILED FEB. 12, 1917. RENEWED FEB. 2, 1920.

1,352,325.                                    Patented Sept. 7, 1920.

Ward Sullivan
Inventor

By Geo. P. Kimmel
Attorney

UNITED STATES PATENT OFFICE.

WARD SULLIVAN, OF SIDNEY, OHIO.

FRUIT-PEELER.

1,352,325.  Specification of Letters Patent.  Patented Sept. 7, 1920.

Application filed February 12, 1917, Serial No. 148,035. Renewed February 2, 1920. Serial No. 355,585.

*To all whom it may concern:*

Be it known that I, WARD SULLIVAN, a citizen of the United States, and resident of Sidney, in the county of Shelby and State of Ohio, have invented certain new and useful Improvements in Fruit-Peelers, of which the following is a specification.

This invention relates to fruit implements, and has more especial reference to an improved orange peeler.

The invention has for its principal object to provide an orange peeling implement, whereby, the outer skin of an orange may be easily and fully removed therefrom with little effort, the peeling operation being such as to allow the fruit to remain whole and unbroken.

It is also an object of the invention to provide a plurality of peeling elements varying in length upon the orange peeling implement in order that the same may be employed to properly peel oranges whose skins are of different thickness.

Another object of the invention is to provide a cutting means in addition to the peeling means, which cutting means may be used to thoroughly remove portions of the skin as adhering to the orange subsequent to the peeling operation.

The improvements in the details and arrangements of parts will be apparent from an inspection of the accompanying drawings, in connection with the specific description hereinafter contained, and wherein the preferred embodiment of the invention is disclosed for imparting a full understanding of the same.

In the drawings.

Similar characters of reference are employed in all of the above described views to indicate corresponding parts.

Figure 1:
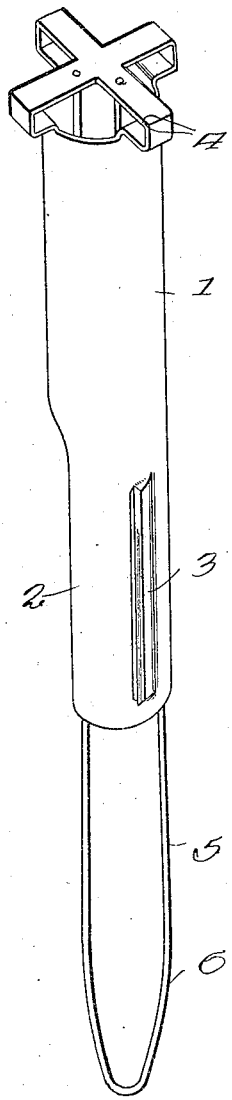
Figure 1 is a perspective of my improved peeling implement.
Figure 2:
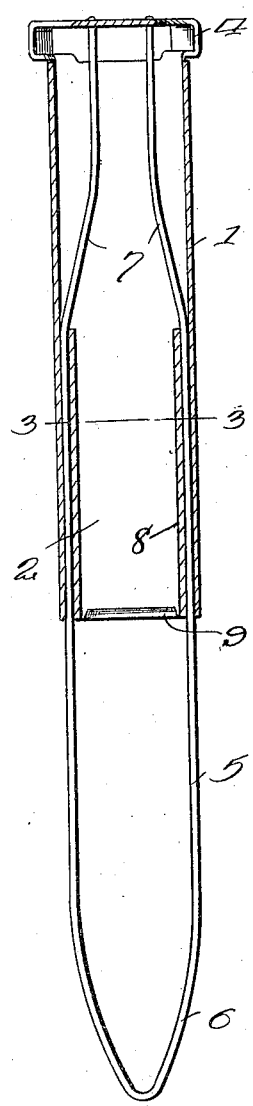
Fig. 2 is a vertical section therethrough.
Figure 3:
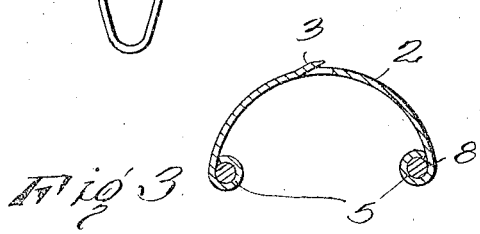
Fig. 3 is a transverse section taken on the line 3—3 of Fig. 2.

Referring now more specifically to the several figures of the said drawings, the improved peeling implement may be stated to comprise a tubular handle portion indicated by the numeral 1, the lower extremity of which is cut away to provide a semi-circular or trough like member 2, within which, preferably in the bottom thereof, a longitudinally extending cutting blade 3 is formed, the cutting portion of the blade projecting for a distance slightly beyond the rear face of the trough like member 2, the purpose of which will be subsequently obvious.

To provide efficient peeling means whereby a portion of the orange skin may be removed from the fruit, a cutting head is arranged upon one end of the handle 1 and comprises a plurality of transversely disposed U-shaped cutting elements generally indicated by the numeral 4 the upper portions of the said cutting elements being formed integral with each other at their junction, while the under portions of the same are engaged or formed integral with the adjacent marginal edge of the said handle 1. By the peculiar arrangement of the various cutting elements 4 upon the handle end it will be noted that the same are disposed at substantially right-angles thereto and project beyond the side portions of the handle. The various cutting elements 4 are of different lengths in order that the same may be adapted for use in connection with oranges whose skins are of varying thickness. Hence, when it is desired to peel an orange having a comparatively thin skin the shorter of the cutting elements 4 is employed. Should the skin be slightly thicker the cutting element next in size to the first mentioned cutting element would be used, and so on until the cutting element as corresponding to the thickness of the orange skin is selected for the peeling operation.

A finger formed of looped wire 5 having one portion of the same curved as at 6 extending longitudinally of the tubular handle 1 is provided and has its free extremity offset as at 7, whereupon it is passed into engagement with portions of the cutting elements 4, whereat the said end may be offset or otherwise secured in position therein. As means for further securing the wire loop 5 in position with respect to the tubular handle 1 and to brace the same, the opposite side edges of the handle, that is, the trough like portions thereof, are rolled upon themselves as at 8 and receive therethrough portions of said wire finger. By providing the finger 5, it will be understood that an efficient orange skin removing means is afforded, which means is adapted to be engaged under the skin of the orange and then moved in a direction to cause loosening and finally removing of the same. The curved extremity 6 of the finger permits the same to readily conform to the spherical body of the orange; thus, facilitating the skin removing operation.

To permit the implement to be used for coring oranges, grape fruit or the like, the lower edge of the trough like member 2 is sharpened as at 9. Thus when the same is engaged with the fruit to be cored the semi-circular member may be forced readily therethrough and then turned to thoroughly remove the core from the fruit.

In using my improved peeling implement for removing the skin from an orange, the base portions of the U-shaped cutting elements are engaged with the skin of the same, that is, that cutting element 4 as corresponding to the thickness of the skin is moved circumferentially about the orange thereby removing a strip of skin of a width corresponding to the particular cutting element therefrom, the said strip of skin passing between the oppositely disposed cutting portions of the said element. With the strip of skin removed from the orange, the implement is now reversed and the curved portion 6 of the wire finger 5 is forced between the skin and the orange and turned upon itself to cause the loosening of the skin and by continued operation the removing of the same without breaking or mutilating the orange to any extent. Should portions of the skin still adhere to the orange subsequent to the peeling operation, the tubular handle 1 may be now grasped by the user in a manner to bring the offset blade 3 into engagement with the same. Thus, by passing the cutting blade over those portions of the orange upon which the skin is adhering, the same may be readily and thoroughly removed therefrom. Should it be desired to core the orange, the wire finger 6 may be forced through the various segments thereof and the sharpened end 8 of the semi-circular member 2 brought into engagement with the same. By turning the handle 1 and forcing the implement downwardly, the center portion of the orange may be instantly removed.

While I have herein illustrated and described with a considerable degree of particularity, constructional details of the device embodying my invention, it is to be understood that the invention is not limited to the particular form and arrangement of the several parts, which may be modified within a wide range without departing from the essence of the invention, the construction shown and the description based thereon being intended to be taken in an illustrative rather than a limiting sense.

I claim:

1. A fruit peeling implement, comprising a tubular handle, a plurality of laterally disposed cutting elements of varying lengths arranged on one end of the handle, and a looped wire finger extending longitudinally of the handle and having the end portions thereof secured to certain of the cutting elements and portions of the sides thereof secured to the sides of the tubular handle.

2. A fruit peeling implement, comprising a handle, and a plurality of laterally disposed U-shaped cutting elements of varying lengths secured to one end of the handle.

3. A fruit peeling implement, comprising a tubular handle having a substantially rectangular shaped strip of metal arranged on one end thereof and projecting laterally beyond the sides of the same, the ends of said strip being sharpened, and a looped wire element secured at one end to the intermediate portion of said strip and extending through the tubular handle to a point beyond the opposite end of the same.

4. A fruit peeling implement, comprising a handle, a plurality of cutting elements varying in length arranged on one end of the handle and projecting beyond the sides thereof, said elements being arranged at right angles with relation to each other, and a looped wire element engaged with the inner ends of certain of the cutting elements and with said handle, the remaining end of the wire element extending to a point beyond the opposite end of said handle.

In testimony whereof, I affix my signature hereto.

WARD SULLIVAN.